March 3, 1936.  E. R. WOLF  2,032,456
VEHICLE SPRING SUSPENSION
Filed June 16, 1934
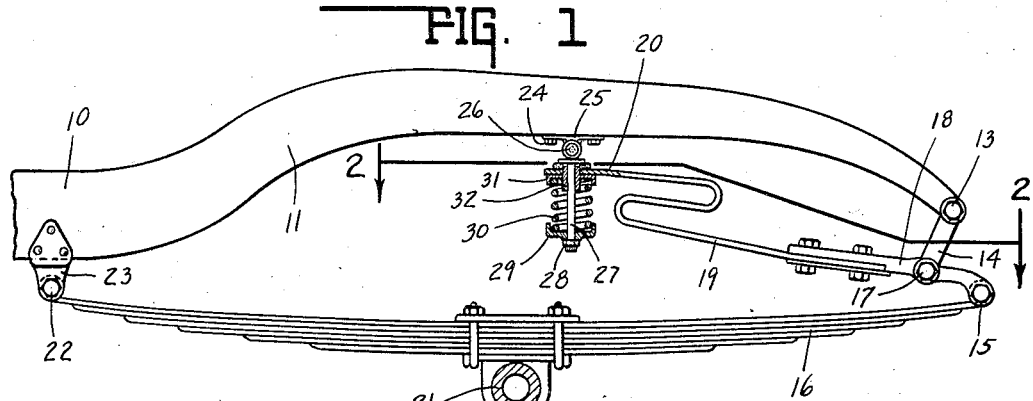
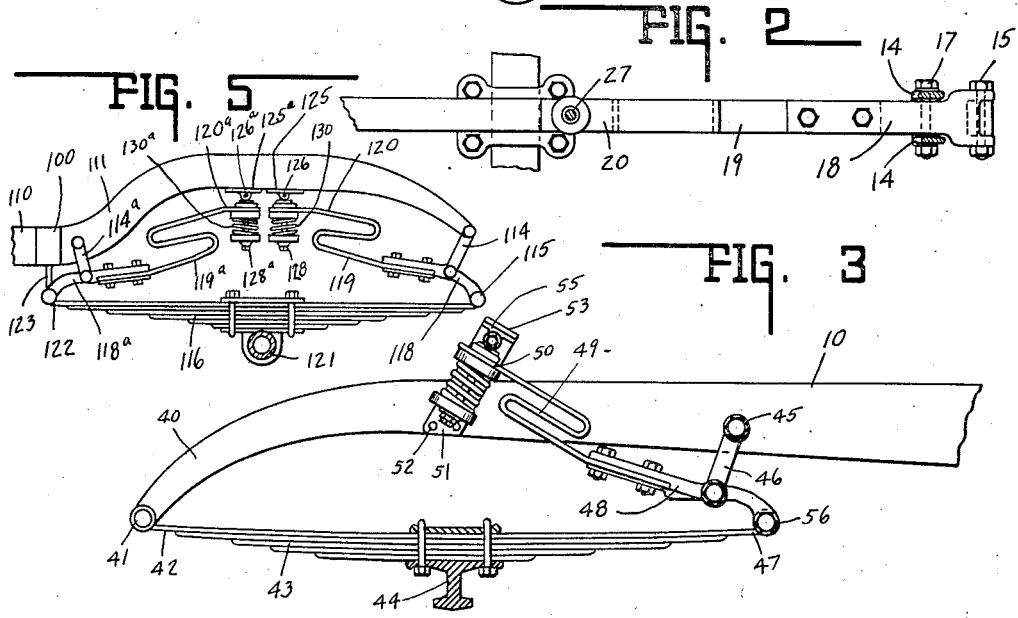
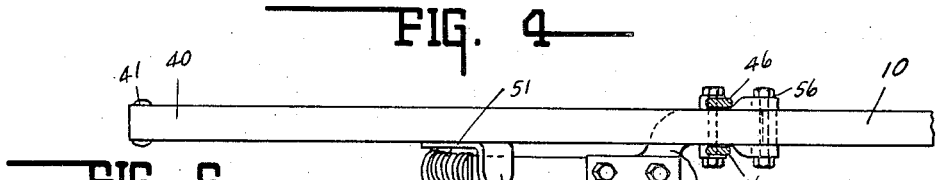
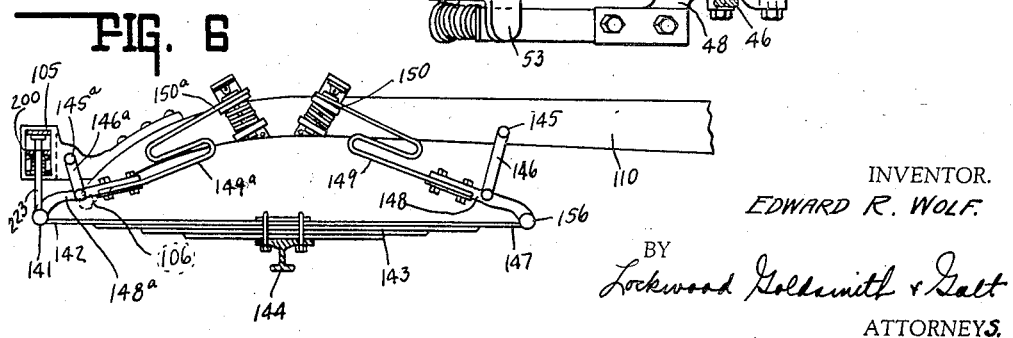
INVENTOR.
EDWARD R. WOLF.
BY
Lockwood Goldsmith & Galt
ATTORNEYS.

Patented Mar. 3, 1936

2,032,456

UNITED STATES PATENT OFFICE 2,032,456

VEHICLE SPRING SUSPENSION

Edward R. Wolf, Indianapolis, Ind.

Application June 16, 1934, Serial No. 730,892

24 Claims. (Cl. 267—17)

This invention relates to a vehicle mounting and has particular reference to the frame and axle connections.

The chief object of the invention is to increase the load capacity of a normal spring suspension through the employment of a modifying connection between the spring and the frame and with the further and more important object of softening the action of the spring construction so that upon bounding the upward movement of the axle and the spring is not translated to an equal degree to the frame, and that upon loading of the vehicle the action of the additional load is not transmitted to the main spring but said additional load is taken up in the invention constituting the improved connection of the spring to the frame.

One feature of the invention consists in providing a longitudinally extensible spring structure adapted for connecting the adjacent portions of the frame and spring.

In one form of the invention the device is applied to the rear wheels and to the rear end of the frame and the spring.

Another form of the invention is illustrated applied to the trailing end of the front spring.

The third form of the invention is applied to both ends of the rear wheel suspension.

Still a further form of the invention is applied to both ends of the front wheel suspension, it being understood that it is possible to utilize the invention as applied to the forward connections of the springs and the frame without embodying the same invention in the rearward connection of said springs.

The full nature of the invention will be understood from the accompanying drawing and the following description and claims:

In the drawing Fig. 1 is a side elevational view of a rear spring and frame with the invention associated with the rear end thereof. Fig. 2 is a top plan view thereof. Fig. 3 is a side elevational view of the front end of the frame and the front spring with the invention associated with the rear end of the front spring. Fig. 4 is a top plan view thereof. Fig. 5 is a more or less diagrammatic side elevation of the rear end of the frame and rear spring with the invention associated with both ends of said spring. Fig. 6 is a more or less diagrammatic side elevation of the front end of the frame and front spring and with the invention associated with both ends of the front spring.

In Figs. 1 and 2 of the drawing, 10 indicates the frame having the upkick 11 at its rear end and terminating in a pivotal support 13. The standard links 14 which normally connect the rear end 15 of the spring 16 of the present invention, however, are pivotally connected as at 17 to an arm 18, which arm has one end pivotally connected to said spring 16 at 15 and its opposite end is associated with a longitudinally extensible spring member formed sinuous in character as at 19, the free end 20 of which is associated with a cushioning or absorbing device.

The spring 16 suitably supports the rear axle 21 in any conventional manner. In this form of the invention the front end of the rear spring 16 at 22 is pivoted upon the frame 10 through the bracket 23. The latter constitutes a conventional connection. Suitably secured to frame 10 as at 24 there is a support member 25 and depending therefrom and pivotally supported thereby as at 26 is an eye-bolt 27 terminating in lock nuts 28 bearing on a cup 29 against which bears one end of a spring 30. This spring is coiled and concentric with the eye-bolt and bears at its opposite end upon a cup 31 oppositely directed relative to cup 29 and said cup is apertured to receive a rubber bushing 32 which extends therethrough and through the end 20 of the extensible arm construction 18—19.

As shown in Fig. 2, the device, as seen in plan, is in longitudinal alignment with the spring and frame.

In Figs. 3 and 4, the invention is shown applied to the rear end of the front spring. In this form of the invention, the frame 10 has a downwardly directed portion 40 terminating in the pivot 41 to which is tied the front end 42 of the front spring 43 suitably supporting the front axle or the like 44. In the conventional automobile construction there is pivotally supported as at 45 a pair of links 46 that normally are connected to the opposite end 47 of the front spring.

In the present invention, however, links 46 are pivotally connected to a longitudinally extensible member 48 which has a sinuous extension portion 49 and an end 50 that is associated with a cushioning structure substantially similar to that shown in section in Fig. 1 except that instead of being of a depending supported type, it is of the elevated supported type. The support therefor consists of the member 51 secured to the frame as at 52 and a plate or arm portion 53 projecting outwardly from the frame and to which is secured the member 56 comparable to member 25 in Fig. 1. The remainder of the structure is substantially the same as that shown in Fig. 1. The other end of the member 48 is connected as at 56 to the rear end 47 of the front spring 43.

As will be observed from Fig. 4, the member 48 is offset intermediate its ends and this is because the front spring of an automobile normally is positioned relatively close to the frame so that the offset arrangement must be utilized in those vehicles wherein the spring is positioned normally relatively close to the frame and this offset, under similar circumstances, when necessary, must be utilized in the rear installation. If the front and rear of the frame both have upkicks providing sufficient distance between the axle and the frame, the offset structure is not, or need not be, employed unless preferred.

In Figs. 5 and 6 modified forms of the invention shown broadly in Figs. 1 and 3 are illustrated. In these forms, the invention generically consists in substituting for said direct tie of the front ends of the front and rear springs to the frame a construction similar to that shown in Figs. 1 and 3 for the rear end of the said springs. If it is desired only to utilize this structure and not the invention applied to the rear end of each or either of these springs, then the usual standard linkage connection previously mentioned is utilized whereby the rear ends of these springs are directly connected by said linkage to the frame.

In the event that both ends of each spring or both ends of either spring are connected by the increasing load capacity and shock softening device, then a pulling connection must be utilized between the front ends of said springs and the frame and this is of such a character that it will not interfere with the softening or cushioning action of the device but provides the necessary connection so that the pulling through the springs is effected.

In Fig. 5, numerals of the 100 series are employed similar to those employed in Fig. 1. However, in this form of the invention, there is provided a linkage 114a that pivotally connects the forward portion of the upkick 111 to the arm 118a intermediate its ends. One end of the arm at 122 is connected to the front end of the spring 116. The other end of the arm through the sinuous longitudinally extensible portion 119a is operatively associated through its end 120a with a cushioning device similar to that shown in Fig. 1 and bearing numerals of the 100 series with the "a" subscript attached.

The additional connection between the front end of the rear spring and the frame includes a member 123 that is suitably connected to the connection 122 and which is slidably associated with a construction 100 mounted on the frame. The purpose of this construction is as follows:—

In the up and down movement of the spring relative to the frame or both, the member 123 has relative sliding movement with respect to construction 100 and but little, if any, horizontal movement. In this manner the pulling power is transmitted between the frame and springs.

In Fig. 6 there is illustrated a modification similar to that shown in Fig. 5 but of the form of the invention shown in Fig. 3. In this form of the invention the rear end 147 of the front spring 143 is connected to the frame 110 by links 146 pivoted at 145 upon said frame and through the arm 148 which includes a similar laterally offset therein as shown in Fig. 4, said arm being connected to the rear end of spring 143 at 156. The sinuous extensible portion 149 has its end 150 associated with a construction shown clearly in Figs. 3 and 4, the interior detailed construction of which is shown very clearly in Fig. 1. The forward end 142 of this front spring is pivotally connected at 141 to an arm 148a similar to the arm 148 but reversely positioned. The sinuous end 149a thereof has its end 150a associated with a similar cushioning or absorbing construction. The links 146a are pivotally connected to member 148a intermediate its ends and are pivotally connected to the frame as at 145a.

By the statement that said links are pivotally connected to the frame, it will be observed, see Fig. 6, that the frame has had applied to it a bracket 105 and this is suitably secured to the end of the frame and, if necessary, the portion shown dotted at 106 of the frame may be cut off. The bracket 105 constituting a rigid extension of the frame includes a construction 200 similar to the construction 100 illustrated in Fig. 5 and slidably associated with said construction 200 is a member 223 which is suitably secured to the connection 141 between the front end of the front spring and the forward end of the member 148a.

The invention as hereinbefore suggested with respect to Figs. 5 and 6 may have eliminated therefrom the portion of the invention illustrated specifically and shown in Figs. 1 and 3, and, in that event, the links 114 and 146 respectively would be directly connected to the points 115 and 156 respectively, which is the normal or standard connection.

The operation of the several forms of the invention shown herein, it is believed, will be readily understood from a description of the operation of the invention as shown in Fig. 1 and to which reference will now be had.

It has been determined that the distance between the axis 17 and the axis 15 is about one-ninth of the total length of the longitudinally extensible lever. The ratio, therefore, is eight to one. When the vehicle is loaded, see Fig. 1, the load is transmitted to the axle through the spring 16 by a portion of it passing through the bracket 23 and another portion passing through the linkage 14 and the bracket 25 and thence through the longitudinal extensible lever to spring 16. It will, thus, be noted that through the interpositioning of this connection between the spring and the frame, the load capacity may be materially increased over the entire structure since a part of that load capacity is provided for in the spring 30. However, it is to be noted that spring 30 is not in reality primarily a load sustaining spring. This is only a secondary and smaller function of that spring per se, but its load function or capacity, as it were, multiplied by a leverage ratio of eight to one does impart to the entire structure an additional load capacity.

Upon the wheel hitting an obstruction, the axle 21 moves up toward the frame and the spring 16 tends to straighten out and also move up. Thereupon, the shock is transmitted upwardly through the bracket 23 and upwardly through the arm 18 and through link 14. However, when transmitted through this connection, the link has its lower end moved forwardly or to the left in Fig. 1 as the spring moves up and this depresses the spring arm 19, part of the resistance being interposed by reason of the sinuous arrangement and the remainder being taken care of by the coil spring 30. It is to be understood that the force and effect of spring 30 and the sinuous portion 19 is relatively weak compared to the strength of spring 16 so that the initial movement of spring 16 due to shock imparted to the axle 20 initially, is fully absorbed by the connection interposed between the spring and the frame and embodying the invention, thus permitting the frame to retain its normal position relative to the roadway in its normal travel.

It has been demonstrated experimentally that a four-by-four placed behind the front wheel and contacted by the rear wheel aligned therewith was traversed by the rear wheel and there was little or no vertical deflection of the rear end of the frame. All of the action caused by the rear wheel engaging and riding over the four-by-four was absorbed by the connection embodying the invention. The action of this connection was initially this,—there was a compression of the spring 30 and there was a longitudinal extension and forward movement of the longitudinal extensible arm. The experiment in figures showed that the cup 31 moved downwardly one and one-half inches, that the arm 18, at its end where it is joined to the extension 19, moved downwardly one and three-fourth inches, and the pivot point 17 moved downwardly one-fourth of an inch. These dimensions are merely given as an illustration of the actual embodiment of the invention applied to a 1925 well known and expensive make of automobile sedan type, utilizing the same frame, the same links 14 and the same spring and bracket member 23 with which the said automobile was originally equipped. It will be thus apparent that the load capacity of the suspension is increased by the invention, that the shock is not transmitted initially to the frame until all of the accommodation of the invention is exhausted. If the shock is more severe than the accommodation of the invention, then the frame will thereafter be elevated with the continued elevation of the spring. In effect, however, the invention stiffens the main spring from the top down as it were for increased load capacity and softens the spring from the bottom up for shock transmittal.

The invention claimed is:

1. In a vehicle, the combination with a leaf spring, a wheel support secured thereto and a frame, of a connection between one end of said spring and the frame, another connection between the frame and the other end of the spring, said last mentioned connection including an arm of longitudinally extensible type pivotally connected at one end to the end of the spring and extending longitudinally thereof and toward the support, a link means pivotally connected at one end to said arm intermediate its ends and connected at the opposite end to the frame, and cushion means carried by the frame and operatively associated with the other end of said longitudinally extensible arm, the arm and link connection being positioned between the support and arm connections to the spring.

2. A device as defined by claim 1 characterized by the longitudinally extensible arm including a sinuous resilient portion.

3. A device as defined by claim 1 characterized by said arm including a laterally offset portion intermediate its ends substantially as and for the purpose described.

4. A device as defined by claim 1 characterized by said arm including a laterally offset portion intermediate its ends substantially as and for the purpose described, and a sinuous portion.

5. A device as defined by claim 1 characterized by said second mentioned spring connection to the frame constituting the forward connection of said spring to the frame, and further characterized by the addition of a member secured to the arm and spring connection, and means carried by the frame with which the last mentioned member is slidably associated for tractively connecting the spring to the frame for pulling purposes.

6. A device as defined by claim 1 characterized by said second mentioned spring connection to the frame constituting the forward connection of said spring to the frame, and further characterized by the addition of a member secured to the arm and spring connection, means carried by the frame with which the last mentioned member is slidably associated for tractively connecting the spring to the frame for pulling purposes, and the longitudinally extensible arm including a sinuous resilient portion.

7. A device as defined by claim 1 characterized by said second mentioned spring connection to the frame constituting the forward connection of said spring to the frame, and further characterized by the addition of a member secured to the arm and spring connection, means carried by the frame with which the last mentioned member is slidably associated for tractively connecting the spring to the frame for pulling purposes, and said arm including a laterally offset portion intermediate its ends substantially as and for the purpose described.

8. A device as defined by claim 1 characterized by said second mentioned spring connection to the frame constituting the forward connection of said spring to the frame, and further characterized by the addition of a member secured to the arm and spring connection, means carried by the frame with which the last mentioned member is slidably associated for tractively connecting the spring to the frame for pulling purposes, and said arm including a laterally offset portion intermediate its ends substantially as and for the purpose described, and a sinuous portion.

9. In a vehicle, the combination with a leaf spring and a frame, of a connection between the front end of the spring and the frame, a similar connection between the rear end of the spring and the frame, each of said connections including a longitudinally extensible arm pivotally associated at one end with the adjacent end of the spring, a link means pivotally mounted upon the frame and pivotally connected to said longitudinally extensible arm intermediate the ends thereof, a cushioning and absorbing construction carried by the frame and operatively associated with the other end of the longitudinally extensible arm, and a pulling connection between the spring and the frame including a member connected to the front end of the spring and connected end of the arm, and mechanism upon said frame slidably supporting said last-mentioned member and non-detachably associated therewith.

10. A device as defined by claim 9 characterized by the longitudinally extensible arm including a sinuous resilient portion.

11. A device as defined by claim 9 characterized by said arm including a laterally offset portion intermediate its ends substantially as and for the purpose described.

12. A device as defined by claim 9 characterized by said arm including a laterally offset portion intermediate its ends substantially as and for the purpose described, and a sinuous portion.

13. In a vehicle, the combination with a leaf spring, a wheel support secured thereto, and a frame, of a connection between one end of said spring and frame, another connection between the frame and the other end of said spring, one of said connections including an arm of longitudinally extensible type connected at one end to the spring end and extending longitudinally of the spring and toward the support, a link means pivotally connected at one end to said arm intermediate the end thereof and adjacent the arm and spring connection, and connected at the opposite end to the frame, means pivitally mounted upon the frame and connected to the other end of said arm, and yielding means associated with said last mentioned means, the arm and link connection being position between the support and arm connections to said spring.

14. In a vehicle, the combination with a leaf spring, a wheel support secured thereto, and a frame, of a connection between one end of said spring and frame, another connection between the frame and the other end of said spring, one of said connections including an arm of longitudinally extensible type connected at one end to the spring end and extending longitudinally of the spring and toward the support, a link means pivotally connected at one end to said arm intermediate the end thereof and adjacent the arm and spring connection, and connected at the opposite end to the frame, means pivotally mounted upon the frame and connected to the other end of said arm, and a coil spring assiciated with said last mentioned means, the arm and link connection being positioned between the support and arm connections to said spring.

15. A device as defined in claim 13, characterized by the longitudinally extensible arm including a sinuous resilient portion.

16. A device as defined by claim 14, characterized by the longitudinally extensible arm including a sinuous resilient portion.

17. A device as defined by claim 13, characterized by said arm including a laterally offset portion intermediate its ends substantially as and for the purpose described.

18. A device as defined by claim 14, characterized by said arm including a laterally offset portion intermediate its ends substantially as and for the purpose described.

19. A device as defined by claim 13, characterized by said arm including a laterally offset portion intermediate its ends substantially as and for the purpose described, and a sinuous portion.

20. A device as defined by claim 14, characterized by said arm including a laterally offset portion intermediate its ends substantially as and for the purpose described, and a sinuous portion.

21. In a vehicle, the combination with a frame, a leaf spring and a support arrangement on the spring intermediate its ends, of a connection between one end of the spring and the frame, a similar connection between the other end of the spring and the frame, each of said similar connections including a longitudinal extensible arm pivotally associated at one end with the adjacent end of the spring, link means pivotally and operatively mounted upon the frame and pivotally connected to said longitudinally extensible arm intermediate the ends thereof and adjacent the arm and spring connection, and a cushioning and absorbing construction carried by the frame and operatively associated with the longitudinal extensible arm, the arm and link connection being positioned between the support arrangement and arm connection to the spring.

22. A device as defined by claim 21, characterized by the longitudinal extensible arm including a sinuous resilient portion.

23. A device as defined by claim 21, characterized by each similar connection including a lateral offset portion therein.

24. A device as defined by claim 21, characterized by the longitudinal extensible arm including a sinuous resilient portion and each connection including a laterally offset portion therein.

EDWARD R. WOLF.